Figures 1, 2:
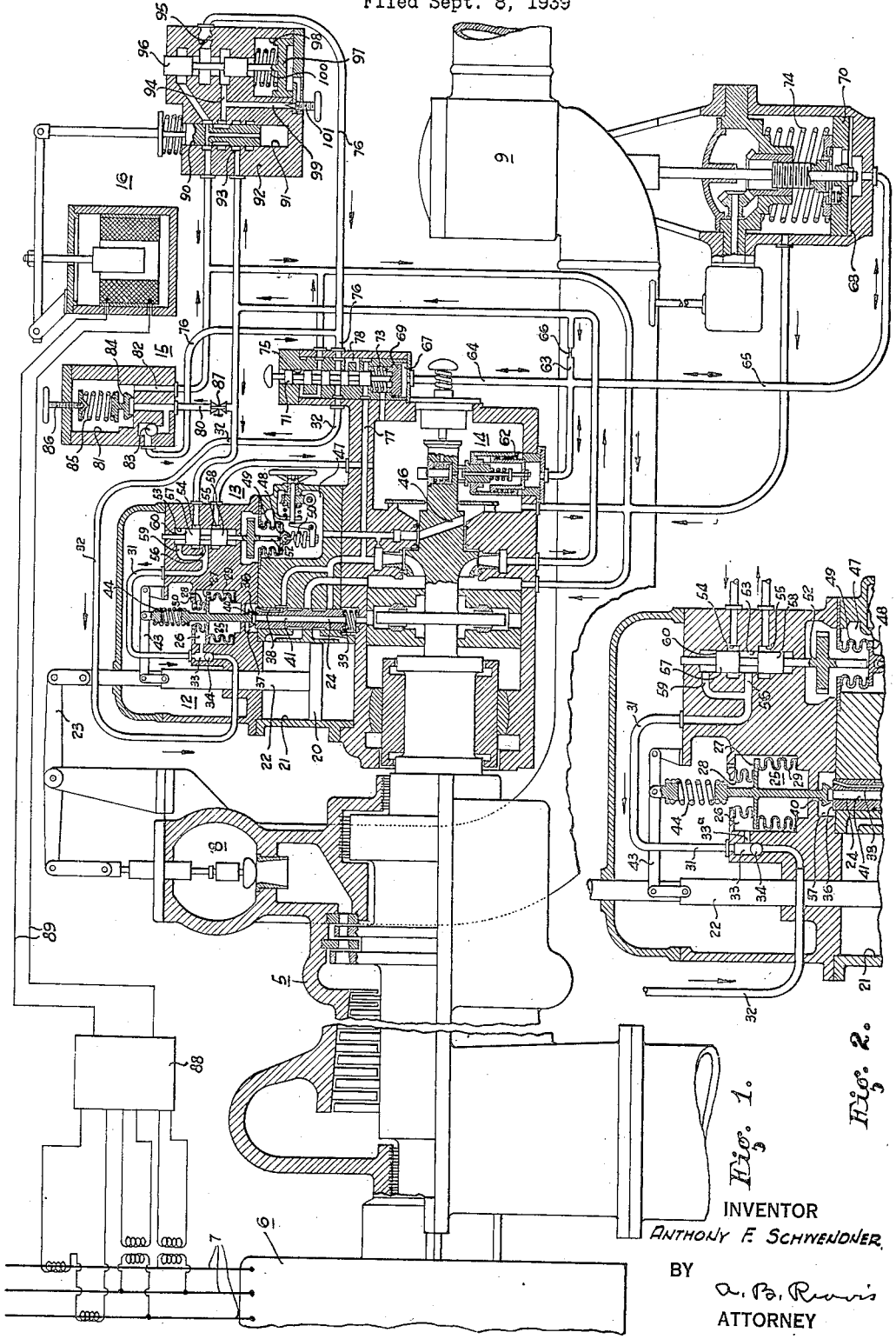

April 1, 1941.  A. F. SCHWENDNER  2,237,118
GOVERNING MECHANISM
Filed Sept. 8, 1939

INVENTOR
ANTHONY F. SCHWENDNER.
BY
a. B. Reavis
ATTORNEY

Patented Apr. 1, 1941

2,237,118

UNITED STATES PATENT OFFICE 2,237,118

GOVERNING MECHANISM

Anthony F. Schwendner, Ridley Park, Pa., assignor to Westinghouse Electric & Manufacturing Company, East Pittsburgh, Pa., a corporation of Pennsylvania Application September 8, 1939, Serial No. 293,884

11 Claims. (Cl. 137—158)

My invention relates to a control arrangement for the admission valve of a prime mover and it has for an object to provide admission valve control mechanism normally utilizing a governor regulating pressure and wherein the regulating pressure may be superseded by a limiting or controlling pressure whenever the latter is effective.

A further object of my invention is to provide pressure-responsive means for controlling a power plant prime mover admission valve such that increases in pressure supplied thereto move the valve in a closing direction and vice versa, together with a plurality of devices responsive to operating characteristics of the plant for furnishing controlling pressures thereto.

A further object of my invention is to provide pressure-responsive means for controlling a prime mover admission valve together with a governor normally furnishing a regulating pressure to the pressure-responsive means and an emergency governor for furnishing an emergency pressure to supersede the regulating pressure in acting on the pressure-responsive means in order to close the admission valve.

A further object of my invention is to provide, in conjunction with a governor controlled turbine, a load limit device which is operative to limit the load carried by the turbine to keep the steam demand of the latter from exceeding the boiler supply.

These and other objects are effected by my invention as will be apparent from the following description and claims taken in conjunction with the accompanying drawing forming a part of this application, in which:

Fig. 1 is a longitudinal sectional view of a prime mover having my improved control apparatus applied thereto; and, Fig. 2 is an enlarged sectional view showing a portion of the governing mechanism shown in Fig. 1.

Referring to the drawing more in detail, the turbine 5 drives a generator 6 connected to a suitable electrical system including the generator leads 7. The turbine has an admission valve 8 and a throttle valve 9. The admission valve is controlled by pressure-responsive means, at 12, so constructed and arranged that, with an increase in pressure supplied thereto, the valve is moved in a closing direction and vice versa.

The pressure-responsive means, at 12, is normally supplied with liquid under regulating pressure by means of the governing mechanism, at 13, and arrangements are provided, as hereinafter pointed out, for a limiting pressure superseding the regulating pressure either to limit opening of the admission valve or to close the latter. The limiting pressure may be any suitable pressure, such as an emergency pressure dependent upon functioning of the turbine emergency governor, at 14, a load limit pressure supplied by the device, at 15, or an anticipating pressure supplied by the apparatus, at 16.

The pressure-responsive means comprises an operating piston 20 arranged in the cylinder 21 and having a rod 22 pivotally connected to the valve lever 23. A pilot valve 24 controls the admission and exhaust of motive fluid to the cylinder 21 to secure movement of the operating piston, movement of the pilot valve being controlled by means of the pressure-responsive device, at 25, including a pressure chamber 26 formed in part by the movable abutment 27 and the bellows 28 and 29, the chamber having a bleeder port 30.

The regulating pressure passage 31 and the limiting pressure passage 32 are joined by the valve chamber 33 to the passage 33a of the pressure chamber 26. Preferably, the chamber 33 is elongated with the passages 31 and 32 joined thereto at the ends thereof and the passage 33a intermediately of its length. A valve 34 is arranged in the valve chamber 33 and it is moved in response to the difference in pressure supplied by the passages 31 and 32 to the valve chamber to effect communication of the passage of larger pressure with the pressure chamber 26. Normally only regulating pressure from the passage 31 is supplied to the valve chamber with the result that the valve 34 effects communication of such passage with the pressure chamber and interrupts communication of the limiting pressure passage 32 with the chamber; however, if a limiting pressure larger than the regulating pressure should be developed whenever required, then such limiting pressure will supersede the regulating pressure and take control of the pressure-responsive device, at 25, and will function either to limit further opening of the admission valve or to close the latter.

Preferably, the construction of the pressure-responsive device, at 25, is such that the force of pressure applied to the abutment 27 does not have to move the pilot valve 24, motive means responsive to fluid pressure and spring forces being available to cause the latter to move to follow the motion of the abutment. For example, the pilot valve 24 has its upper end or piston area 36 exposed to pressure in the chamber 37 supplied with fluid by means of an orifice 38 and a spring 39 exerts its force upwardly against the lower end of the piston valve.

The abutment 27 has a cup valve 40 arranged in covering relation with respect to the drain bore 41 formed in the piston valve 24. The position of the piston valve is, therefore, determined by equilibrium of the fluid pressure force acting downwardly on the piston area 36 with the force of the spring 39 acting upwardly on the pilot valve, the piston area 36 defining, with the cup valve 40, an annular orifice of such flow area as to maintain in the chamber 37 a pressure such that the force thereof acting on the piston valve is in equilibrium with the spring force.

If the cup valve 40 is moved by the pressure abutment 27 relatively to the piston area 36, then the flow area of the annular orifice is thereby changed, bringing about a change in pressure in the chamber 37 and the latter change results in movement of the pilot valve, the pilot valve following the motion of the cup valve until the annular orifice has such flow area that the force of pressure established in the chamber 37 is in equilibrium with the force of the spring.

The operating piston 20 moves in consequence of movement of the pilot valve, this movement continuing until it restores the pilot valve to neutral, cut-off position. To this end, the operating piston rod 22 is connected by follow-up linkage 43 acting on one end of the link spring 44, the other end of the latter being connected to the abutment 27. A change in pressure supplied to the chamber 26 results in movement of the abutment 27 and the cup valve 40, following movement of the pilot valve 24, and consequent movement of the operating piston 21, the latter moving and changing the force of the link spring 44 until the resultant of the force thereof and of the force of pressure acting on the abutment 27 restore the cup valve 40 to such a position that the pilot valve 24 occupies its neutral position.

The governing mechanism, at 13, is preferably of the pressure transformer type, it utilizing a change in force due to change in prime mover speed to secure a relatively larger change in regulating or transformed pressure.

The primary or controlling force for the governing mechanism, at 13, may be provided by any suitable means, for example, by fluid impeller apparatus, at 46. As shown, the primary or controlling force of the transformer governor provided by the primary or controlling pressure is supplied to the primary pressure chamber 47 of the governor, at 13, the chamber 47 being enclosed in part by the pressure abutment 48 and the bellows 49, a spring 50 exerting its force on the abutment 48 in opposition to the force of the governing pressure acting thereon.

The abutment 48 applies primary force to the transformer member 52 in consequence of which the latter provides a secondary or transformed fluid pressure. For example, the member 52 may be in the form of a spinner piston fitting the cylinder 53, the cylinder having spaced pressure and exhaust ports 54 and 55 and a transformed pressure port 56 arranged therebetween.

The spinner piston valve has upper and lower lands 57 and 58 whose adjacent edges just lap the pressure and exhaust ports 54 and 55. The transformed pressure port 56 is connected to the passage 31 joined to one end of valve chamber 33. Also, the transformed pressure port has a branch passage 59 communicating with the upper end of the cylinder 53 so as to supply liquid under transformed pressure for action on the upper piston area 60 of the spinner piston valve.

As the spinner piston valve lands normally just lap the pressure and exhaust ports 54 and 55, only a very small movement in response to change in controlling pressure acting on the abutment 48 is necessary to bring about a change in transformed pressure, a decrease in controlling pressure resulting in downward movement of the spinner piston valve to decrease the transformed pressure and vice versa. If the transformed pressure changes, the force thereof acting on the upper end of the piston valve also changes and these changes will continue until the spinner piston valve is restored to neutral position.

The other passage 32 of the valve chamber 33 is supplied with any suitable limiting pressure to supersede the transformed or regulating pressure and bring about movement of the pressure-responsive means, at 12, in order to limit movement of the admission valve or to close the latter.

The emergency governor, at 14, when operated due to attainment of a predetermined turbine overspeed, trips the spill valve 62 to relieve the pressure in the space 63 including passages 64 and 65, the space being normally maintained under pressure by oil supplied through the orifice 66. The passages 64 and 65 are connected, respectively, to cylinders 67 and 68, the latter having pistons 69 and 70, respectively, arranged therein, the piston 69 being connected to the piston or intercepting valve 71, hereinafter more fully described, and the piston 70 being connected to the throttle valve 9, the effect of pressure acting on the piston 70 being to hold the throttle valve in open position. Springs 73 and 74 act downwardly on the pistons 69 and 70, respectively, so that, with release of pressure in the space 63 incident to opening of the spill valve, the pistons 69 and 70 are moved downwardly, such movements resulting in closure of the throttle valve and operation of the intercepting valve in the manner to be described.

The intercepting valve 71 is arranged in the cylinder 75 and it normally effects communication between said limiting pressure passage 32 and the passage 76. When the intercepting valve 71 moves to its downward position, incident to release of pressure in the space 63, it effects communication between the pressure passage 77 and the passage 32, the cylinder having a U-shaped passage or port 78 serving to effect this communication, the emergency pressure so provided and furnished to the passage 32 superseding the regulating pressure and operating the pressure-responsive means, at 12, in order to close the admission valve.

With the emergency governor reset, pressure established in the space 63 and the piston valve in its upper position, the passage 76 communicates with the limiting pressure passage 32 and the effects of the load limit device, at 15, and of the anticipating device at 16, may be conveniently utilized by the first passage, these devices providing load limit and anticipating pressures for the limiting pressure passage 32.

The load limit pressure is continuously applied to one end of the valve chamber 33, but, as the regulating or transformed pressure is larger than the load limit pressure, at least for the major or substantial portion of the turbine load range, the valve 34 is acted upon by the superior regulating pressure to maintain the latter in communication with the pressure chamber 26. As soon as the regulating pressure tends to become less than the load limit pressure, the latter supersedes the former and prevents further operation of the pressure-responsive means, at 12, to open the admission valve wider.

With the generator 6 connected to an electrical system, it may happen that the turbine will be loaded beyond the capacity of the boiler supplying it; and, for this reason, the load limit device, at 15, is employed to limit the turbine load, the device coming into play, when the predetermined load is reached, to prevent the governor from opening the admission valve wider.

As shown, the load limit device, at 15, comprises conduit means 80 including a housing structure 81 having a relief passage 82 and a check valve 83. A back-pressure valve 84, preferably of the cup type, covers the discharge end of the passage 82 and it is held in closing relation with respect thereto by the spring 85, whose force may be varied by adjustment of the threaded follower 86.

Fluid under pressure is supplied to the conduit means 80 from any suitable source through a valve or orifice 87 and such fluid is conducted thereby to the passage 76, which is placed in communication with the control passage 32 by the intercepting valve 71. With this arrangement, the pressure of fluid in the conduit means 80 is determined by the closing force exerted on the back-pressure valve 84 by the spring 85.

Normally, the regulating pressure exceeds the load limit pressure with the result that the valve 34 places the regulating pressure passage 31 in communication with the pressure chamber 26 and interrupts communication of the limiting pressure passage 32 therewith. As the load increases, both the speed and the regulating pressure decrease; and, when the regulating pressure declines to a value such that it may be overcome by the load limit pressure, the latter acts on the valve 34 to prevent the admission valve being opened wider. By adjusting the spring 85, the load limit pressure may be set to limit the steam demand within the capacity of the boiler.

The anticipating device, at 16, more particularly described and claimed in my application Serial No. 293,883, filed Sept. 8, 1939, also furnishes a limiting pressure or impulse to the communicating passages 76 and 32 in case of sudden load drop to prevent overspeeding of the turbine and generator sufficiently to operate the emergency governor. The anticipating limiting pressure or impulse being substantially larger than the regulating pressure, it supersedes the latter and closes the admission valve. In general, the anticipating device, at 16, furnishes a limiting pressure in response to a predetermined rate of load drop as determined by the watt meter element 88 associated with the generator leads 7 and having a control circuit 89 for the device, at 16.

With completion of the control circuit 89 incident to sudden load drop, the piston valve 90 arranged in the cylinder 91 of the body 92 of the device, at 16, places the pressure supply passage or port 93 in communication with the passage 94, the latter communicating, through a check valve 95, with the passage 76.

Concurrently with application of pressure to the passage 94, such pressure is also applied to a timing valve 96 so that, after a predetermined short interval, it interrupts the passage 94, whereupon application of anticipating limiting pressure to the pressure chamber 26 ceases, pressure in the latter declining, due to the bleeder port 30, and the governor, at 13, regaining control of the turbine.

As shown, the timing valve 96 is connected to a piston 97 arranged in the cylinder 98 supplied with fluid under pressure by the passage 99 communicating with the passage 94. The spring 100 normally holds the timing valve in open position. The passage 99 has an adjustable orifice 101 so that the interval during which the anticipating control pressure is effective may be varied.

Thus, it will be seen, that the control device, at 16, operates in response to completion of the control circuit to supply a limiting fluid pressure to the pressure-responsive device, at 12, to close the admission valve and that the duration of effectiveness of the device, at 16, is independent of the watt meter element 88 as well as the position of the piston valve 90, such duration of effectiveness being dependent upon the time required for pressure acting on the piston 97 to move the timing valve 96 to interrupting position and the time required for this purpose being varied by suitable adjustment of the orifice 101.

From the foregoing, it will be seen that I have devised control apparatus for the admission valve of a prime mover of a power plant installation and which includes means normally positioning the admission valve in accordance with a speed characteristic of the prime mover but which also includes other means responsive to other characteristics of the plant, such as overspeeding sufficiently to operate the emergency governor, reaching a predetermined limit of load, or sudden load drop, to provide impulses or pressures for superseding the regulating or governor pressure to prevent wider opening of the admission valve or to close the latter. Preferably, the various control devices, including the speed governor, the emergency governor, the load limit device, and the anticipating device are connected by passageway means to the pressure-responsive element of a servo-motor which controls the position of the admission valve, and valve means are associated with the passageway means to secure the desired operation of the servo-motor in response to the various pressures. Normally, of course, aside from the regulating pressure supplied by the governor, the only other continuously acting pressure is the load limit pressure; and, as the latter is less than the regulating pressure until the predetermined load is reached, determined by the setting of the load limit device spring, it is assured that the valve means will operate to establish communication of the reguating pressure with the servo-motor with interruption of the load limit pressure with respect to the latter. In case of sudden development of high pressures, due, for example, to operation of the emergency governor or of the anticipating device, such pressures supersede the governor regulating pressure in control of the servo-motor and close the admission valve. Aside from the valve means operating to establish proper communication of the effective controlling device with the servo-motor, such valve means also prevents the effective fluid pressure from being applied to the other controlling device or devices.

More particularly, as illustrated, the "valve means" comprises the valves 34, 71, 83 and 95: the valve 34 normally placing the regulating passage 31 in communication with the servo-motor pressure responsive device, at which time, with the valve 71 in its normal position preventing backflow to the emergency governor mechanism, the check valve 95 prevents backflow of fluid under continuously maintained load limit pressure to the anticipating device and being movable to establish communication of the limiting pressure passage 32 with such pressure responsive device whenever the pressure therein is greater than the regulating pressure, as would be the case when the regulating or transformed pressure declines sufficiently due to increase in load or when the emergency or anticipating pressures are effective; the valve 71 normally occupying a position to maintain communication of the load limiting and anticipating device with the passage 32 with prevention of backflow of fluid under either load limit or anticipating pressure to the emergency governor mechanism and movable to a second position, when the emergency governor is effective, to provide emergency limiting pressure for the passage 32 with positive interruption of backflow thereof to the load limit and anticipating device; and the valves 83 and 95 operating, respectively, to prevent backflow from the anticipating device to the load limit device when the anticipating pressure is effective and to prevent backflow from the load limiting device to the anticipating device when the load limit device is effective.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a prime mover having an admission valve, of pressure-responsive means for controlling the admission valve such that with an increase in pressure supplied thereto the admission valve is moved in a closing direction and vice versa, means for supplying fluid under pressure to the pressure-responsive means including first and second passages joined by a valve chamber to a third passage communicating with the pressure-responsive means, said valve chamber being elongated and cylindrical and the junction of the third passage therewith being arranged intermediately of the junctions therewith of the first and second passages, a ball valve in the chamber and movable in response to pressures applied thereto from the first and second passages to control communication of such passages with the third passage depending upon which of the pressures in the first and second passages is the greater, a governor providing a fluid under regulating pressure which ranges from a maximum at no load to a minimum at full load of the prime mover and supplying such fluid to the first passage, means for supplying fluid under pressure to the second passage, said second passage having a relief opening, a relief valve having closing relation with respect to the opening, a spring whose force urges the valve in a closing direction, and means for varying the spring closing force so that pressure in the second passage may be greater than the minimum pressure of the regulating pressure range of the governor.

2. The combination with a prime mover having an admission valve and a throttle valve, of pressure-responsive means for controlling the admission valve such that with an increase in pressure supplied thereto the admission valve is moved in a closing direction and vice versa, a main governor responsive to prime mover speed to provide a regulating pressure which ranges from a maximum at no load to a minimum at full load of the prime mover, emergency governor apparatus operative in response to a predetermined prime mover overspeed to close the throttle valve and to provide an emergency fluid pressure higher than the maximum pressure of the regulating pressure range of the main governor, passageway means for supplying fluid under regulating and emergency fluid pressures to the pressure-responsive means, and valve means associated with the passageway means and responsive to the higher of said pressures for supplying the fluid of higher pressure to the pressure-responsive means.

3. The combination with a prime mover having an admission valve, of force-responsive means for controlling the admission valve such that an increase in force is followed by movement of the admission valve in a closing direction and vice versa, means providing a governing force which ranges from a minimum at full load to a maximum at no load of the prime mover, means providing a load limit force falling within the governing force range, and means for applying said forces to the force-responsive means so that, as long as the governing force is greater than the load limit force, the governing force controls the force-responsive means to adjust the admission valve suitably to the load, and, when the governing force becomes less than the load limit force, the latter supersedes it in controlling the force-responsive means and prevents wider opening of the admission valve.

4. The combination with a prime mover having an admission valve, of force-responsive means for actuating the admission valve such that an increase in force is followed by movement of the admission valve in a closing direction and vice versa, means providing a governing force which ranges from a minimum at full load to a maximum at no load of the prime mover, means including a spring providing a load limit force falling within the governing force range, means for adjusting the spring to vary the load limit force, and means for applying said forces to the force-responsive means so that as long as the governing force is greater than the load limit force it controls the force-responsive means to adjust the admission valve suitably to the load, and, when the governing force becomes less than the load limiting force, the latter supersedes it in controlling the force-responsive means and prevents wider opening of the admission valve.

5. The combination with a prime mover having an admission valve, of pressure-responsive means for controlling the admission valve such that an increase in pressure is followed by movement of the admission valve in a closing direction and vice versa, means providing a regulating fluid pressure which ranges from a minimum at full load to a maximum at no load of the prime mover, means providing a load limit fluid pressure falling within the regulating pressure range, and means for applying the fluid pressures to the pressure-responsive means so that as long as the regulating pressure is greater than the load limit pressure it controls the pressure-responsive means to adjust the admission valve suitably to the load, and, when the regulating pressure becomes less than the load limit pressure, the latter supersedes it in controlling the pressure-responsive means and prevents wider opening of the admission valve.

6. The combination with a prime mover having an admission valve, of pressure-responsive means for controlling the admission valve such that an increase in pressure is followed by movement of the admission valve in a closing direction and vice versa, means providing a regulating fluid pressure which ranges from a minimum at full load to a maximum at no load of the prime mover; apparatus for developing load limit pressure falling within the regulating pressure range and including means providing a space having an escape opening, a fluid-pressure source, means for supplying fluid from said source to said space, a valve for said opening, biasing means for urging the valve in the direction to restrict escape of fluid from the opening, whereby fluid under pressure corresponding to a load limit dependent upon the force of the biasing means may be maintained in the space, and means for adjusting the force of the biasing means; and means for applying the regulating and load limit fluid pressures to the pressure-responsive means so that as long as the regulating pressure is greater than the load limit pressure it controls the pressure-responsive means to adjust the admission valve suitably to the load, and, when the regulating pressure becomes less than the load limit pressure, the latter supersedes it in control of the pressure-responsive means.

7. The combination with a prime mover having an admission valve, of pressure-responsive means for controlling the admission valve such that with an increase in pressure supplied thereto the admission valve is moved in a closing direction and vice versa, first and second passages for supplying fluid under pressure to the pressure-responsive means, a first device for supplying to the first passage fluid under regulating pressure varying as a function of the prime mover speed, a second device for supplying fluid under pressure to the second passage, and valve means operable in response to both of said pressures to connect the passage of higher pressure to the pressure-responsive means.

8. The combination with a prime mover having an admission valve, of pressure-responsive means for controlling the admission valve such that with an increase in pressure supplied thereto the admission valve is moved in a closing direction and vice versa, a plurality of devices providing fluid pressures, one of said devices providing a first or regulating fluid pressure varying as a function of the prime mover speed and the other of said devices providing a second fluid pressure, passageway means for conducting fluid from said devices to the pressure-responsive means, and check valve means operative to connect the device furnishing the higher pressure to the pressure-responsive means and to prevent flow of such higher pressure fluid to the other device.

9. The combination with a valve, of pressure-responsive means for controlling the valve such that with an increase in pressure supplied thereto the valve is moved in a closing direction and vice versa, means for supplying fluid under pressure to the pressure-responsive means including first and second passages joined by a valve chamber to the pressure-responsive means, said valve chamber being elongated and being of substantially uniform section, a valve member having close clearance with respect to the interior wall of the chamber and movable lengthwise of the latter to connect either of the passages with the pressure-responsive means and to interrupt communication of the other passage with the latter, means providing for the first passage fluid under regulating pressure normally acting on the valve member to place the first passage in communication with the pressure-responsive means to apply the regulating pressure to the latter and providing for the regulating pressure varying over a range sufficient to provide for a range of adjustment of said first valve, and means providing for the second passage fluid under second pressure greater than the minimum pressure of the regulating pressure so that when it is larger than the latter it may move the valve member to place the second passage in communication with the pressure-responsive means to secure application of fluid under second pressure to the pressure-responsive means for operation of the latter as determined by the magnitude of the second fluid pressure.

10. The combination with a prime mover having an admission valve, of pressure-responsive means for controlling the admission valve such that an increase in pressure supplied thereto is followed by movement of the admission valve in a closing direction and vice versa, means for supplying fluid under pressure to the pressure-responsive means and including first and second passages joined by a valve chamber to the pressure-responsive means, means providing a regulating pressure which ranges from a maximum at no load to a minimum at full load of the prime mover and for supplying the regulating pressure to the first passage, means providing a second pressure and for supplying it to the second passage, and a valve member in the chamber and subject at opposing sides to pressures supplied to the chamber by the passages so that it may move in response to the larger of the pressures to connect the passage of larger pressure to the pressure-responsive means.

11. The combination with a prime mover having an admission valve, of pressure-responsive means for controlling the admission valve such that with an increase in pressure supplied thereto the admission valve moves in a closing direction and vice versa, first and second passages for supplying fluid under pressure to the pressure-responsive means, means for supplying to the first passage fluid under regulating pressure which ranges from a maximum at no load to a minimum at full load of the prime mover, a source of fluid under pressure, means for supplying fluid from said source to the second passage, means including a back pressure valve for maintaining in the second passage a fluid pressure falling within the regulating pressure range, and valve means responsive to regulating pressure as long as the latter exceeds the load limit pressure to provide for communication of the first passage with the pressure-responsive means and responsive to load limit pressure when the regulating pressure becomes less than the latter to interrupt application of regulating pressure to the pressure-responsive means to limit further opening of the admission valve.

ANTHONY F. SCHWENDNER.